3,313,846
POLYETHERS AND METHOD OF MAKING SAME
Manuel Slovinsky, Corpus Christi, Tex., assignor to Celanese Corporation, a corporation of Delaware
No Drawing. Filed Aug. 9, 1960, Ser. No. 48,367
1 Claim. (Cl. 260—484)

This invention relates to novel polyethers and to method of making the same as well as to a novel catalyst system which is utilized in such method.

Several methods employing a wide number of catalyst systems have been reported for the polymerization of olefin oxides. Typical of such catalysts are metallic alkoxides, metal halides, metal oxides, and various combinations of the above. However, the olefin oxide polymers produced by methods employing such catalysts have not been entirely satisfactory for many purposes. Frequently the polyether-type polymer produced by such prior-art methods showed an undesirable degree of unsaturation. In addition, frequently such polyethers did not contain a very high hydroxyl content, so that they were not particularly suitable for the further reaction with a diisocyanate to form polyurethanes.

Accordingly, it is the object of my invention to provide a method for making polymers of olefin oxides which have a comparatively high hydroxyl content and a comparatively low degree of unsaturation.

It is a further object of my invention to provide novel intermediate polyethers which are utilizable in the above described method.

It is another object of my invention to provide a novel catalyst system utilizable for the polymerization of olefin oxides.

Other objects of this invention will be apparent from the following detailed description and claim. In this description and claim, all proportions are by weight unless otherwise indicated.

In accordance with one aspect of this invention, the polymerization of olefin oxides is conducted in the presence of a zinc salt of an organic acid. For best results, however, I have found that when this zinc salt is employed in combination with a second compound which will be hereinafter described, there is provided an excellent novel catalyst system for the polymerization of olefin oxides, particularly for the method of this invention.

The second compound to be used in combination with the zinc salt of an organic acid is preferably aluminum hydroxide. This aluminum hydroxide may be preformed aluminum hydroxide or it may be produced in situ by using a compound which forms aluminum hydroxide in situ by hydrolysis under the condition of the process. Such aluminum compounds include aluminum alkoxy compounds, basic aluminum acetate, and aluminum oleate. Most effective of the aluminum alkoxy compounds is aluminum isopropylate with aluminum ethylate as well as the aluminum alkoxides of polypropylene glycols giving desirable results.

Basic feric acetate, isopropyl borate and boric acid also may be used as the second compound used in combination with the zinc salt.

The zinc salt is of an organic acid which may be a typical alkanoic acid such as formic acid, acetic acid, or the like.

It will be understood that the method of my invention is applicable not only for the homopolymerization of an olefin oxide but also may be used for the copolymerization of two or more olefin oxides such as the copolymerization of propylene oxide and butylene oxide.

The polymerization method of this invention is preferably conducted at a temperature between about room temperature and 200° C. A more preferred temperature range is from about 60° to 140° C. The rate of polymerization is dependent on the temperature. For example, all other conditions being the same, it should take 2 to 3 hours at 130°–150° C. to polymerize propylene oxide to the same extent as would take 40 hours at 60° C. and 3 to 4 weeks at room temperature. Pressures are not critical to the process. In the examples where sealed glass ampules containing the material to be polymerized are used, the initial pressure is the pressure of the material. This pressure diminishes as polymerization progresses.

The amount of catalyst to be used will depend in part upon the particular monomer to be polymerized and also upon the particular catalyst used. In general, I prefer to use from about 0.2 to 10 parts of catalyst per 100 parts of monomer. A more preferred range is from about 1.0 to 4.0 parts of catalyst per 100 parts of monomer. When the above described novel catalyst system is used, the zinc salt and the trivalent compound are advantageously present in equimolecular proportions.

I found that when water is used within particular limits in combination with the catalysts system, the rate of polymerization is enhanced. The preferable range of proportions of water used is from about 0.3% to about 1.0%. Thus, the molecular weight of the polymers may be regulated to a considerable degree by controlling the amount of water present in the reaction mixture. One way the water content may be controlled is by using a hydrated zinc salt such as zinc acetate dihydrate in the catalyst system. In the method of this invention, the polymerization is preferably conducted in the absence of solvent. However polymerization may also be conducted in a solvent medium such as a benzene or nitrobenzene medium.

The polymers produced by the foregoing method are novel polyethers ranging in molecular weight from 1000 to 8000 having terminal carboxylate groups. They are also characterized by a relatively high hydroxyl content in the range of from 0.4 to 3.0% of the polymer by weight and low degree of residual unsaturation. Because of these terminal carboxylate groups, these polymers provide valuable intermediate polymers which may be used in the production of polyethers of olefin oxides having a maximum hydroxyl functionality. In certain instances, particularly in the production of polyurethanes, there is a need for polyethers of olefin oxides having a maximum hydroxyl functionality. As has been previously mentioned, existing methods have not produced a polyether of olefin oxides having a maximum degree of hydroxyl functionality. This is believed to be due to the formation of olefinic linkages at the terminals of the polymer molecule, which linkages act as chain stoppers or chain terminators, thereby reducing the number of molecule terminals at which hydroxyl groups may act as chain terminators. In my method it is believed that the carboxylate anions present during the polymerization form ester linkages with the polymer molecules, thereby acting as chain terminators, to produce a polymer having carboxylate terminal groups. These carboxylates may then be readily saponified to hydrolize the carboxylate ion to form hydroxyl terminal groups on the polymer molecules. The resulting polyether has a comparatively high hydroxyl content.

The novel polymers of this invention are also useful in the production of elastomers which require high hydroxyl functionalities such as polyurethane elastomers.

In accordance with another aspect of my invention, I have found that if the zinc salt of an organic acid containing a free alcoholic hydroxyl group, e.g. hydroxy acetic acid, is used in the catalyst system, then the above-mentioned saponification step may be avoided, because for each ester linkage in the polymer there is already available a free alcoholic hydroxyl group, this group being contributed by the organic anion. There is, accordingly, produced a novel polyether having terminal hydrocarboxylate groups.

The molecular weights given in the examples which follow were determined by the analysis of end groups. That is, based upon the assumption that each molecular must have two end groups, either hydroxyl, carboxylate or olefinic and that hydroxyl, carboxylate or olefinic groups could only be at the end of molecules, the number of hydroxyl, carboxylate and olefinic groups for a given weight were determined and the molecular weight determined therefrom.

The following examples will more fully illustrate my invention. All parts are by weight unless otherwise indicated.

Example I

The following material was charged into a dry, nitrogen-flushed stainless steel reactor.

| Reactant: | Weight (gm.) |
| --- | --- |
| Propylene oxide (0.079 weight percent water), 36.2 moles | 2100 |
| Aluminum isopropylate, 0.154 mole | 31.5 |
| Zinc acetate dihydrate $(Zn(CH_3COO)_2 \cdot 2H_2O)$, 0.154 mole | 33.7 |

The total water content of the reacting mixture was 0.33 weight percent. The above mixture was heated to about 123° C., in 30 minutes with the pressure building up to about 150 p.s.i.g. The temperature was maintained thereafter between about 135 and 150° C., with the pressure constantly dropping. After three hours from the beginning of the process the pressure was down to 6 p.s.i.g. 5.5 pounds of benzene were then added and the solution was transferred to a round bottom glass flask. In order to remove the acetate groups, 61 gm. of 85 weight percent potassium hydroxide dissolved in one liter of isopropyl alcohol were added to the benzene solution (theoretical requirement, 17.4 gm. of pure potassium hydroxide). The mixture was maintained at 75° C. for about three hours while stirring. At the end of this time two washings with warm 2 weight percent water solutions of sulfuric acid were provided, followed by 3 warm water washings. The benzene solution of the polymer was then stripped at a maximum temperature of about 110° C. and a pressure of 7 mm. Hg absolute. The amount of polymer obtained was 2016 grams, representing a 96 percent yield based on propylene oxide. The resulting polypropylene oxide showed a hydroxyl content of 0.9 (weight percent), an unsaturation of 0.007 (meq./g.), a viscosity (4 weight percent solution in benzene at 25° C.) of 3.04, a molar hydroxyl to unsaturation ratio of 75/1, and a molecular weight of 3700 (by end group analysis).

Example II

The following amounts of reactants were charged into a dry, nitrogen-flushed stainless steel reactor.

| Reactant: | Weight (gm.) |
| --- | --- |
| Propylene oxide (0.065 weight percent water), 5.17 moles | 300 |
| Aluminum isopropylate, 0.022 mole | 4.5 |
| Zinc formate dihydrate[1], 0.022 mole | 4.2 |

[1] Zinc formate dihydrate was prepared from sodium formate and zinc chloride, recrystallized from water and dried at approximately 40° C. overnight.

The above mixture was stirred at about 117–119° C. for about five hours without any appreciable change in pressure, which was between about 139 and 146 p.s.i.g. Thereafter a steady pressure drop was obsreved and the temperature increased to a maximum of about 142° C. After 9.5 hours total reaction time the pressure was about 70 p.s.i.g. and the process was stopped. The crude product was removed from the reactor with 500 cc. of benzene. The solution was washed twice with a warm (60–70° C.) 3 weight percent solution of sodium hydroxide. Although a fine emulsion was formed with each washing, it broke very neatly after about twenty to thirty minutes. Three water washings were then carried out. The product was stripped first in a steam bath and finally in a vacuum oven at a temperature of about 100° C. and a pressure of 6 mm. Hg absolute for 4 hours. The polypropylene oxide was obtained in about 75 percent yield based on propylene oxide. This polymer had a hydroxyl content of 1.2 weight percent, an unsaturation (expressed in meq./g.) of 0.01, a saponification number of 8.4, and a molecular weight of 2360.

Example III

The following charge was sealed in a glass ampule.

| Reactant: | Weight (gm.) |
| --- | --- |
| Propylene oxide (0.055 weight percent water), 1.72 moles | 100 |
| Basic aluminum acetate $(Al(OH)(CH_3COO)_2)$ (4.7 weight percent water), 0.008 mole | 1.35 |
| Zinc acetate dihydrate, 0.008 mole | 1.76 |

The water content of the above reaction mixture was 0.4 weight percent. The ampule was kept tumbling in a 60° C. bath. The first signs of polymerization occurred after about two weeks. After 14 weeks unreacted propylene oxide was removed under vacuum leaving 71 gms. of crude polymer. A benzene solution of this polymer was washed three times with dilute sulfuric acid solution and three times with water. Dehydration under vacuum at 100° C. left 70 grams of polymer having the following properties: hydroxyl content (weight percent) 1.2, unsaturation (meq./g.) 0.004, saponification number 17.3, and a molecular weight of 2000. The polymer was a white, crystalline, moderately hard paste.

Example IV

The procedure described in Example III was repeated, however, the catalyst consisted of a combination of basic ferric acetate $(Fe(OH)(CH_3COO)_2)$ and zinc acetate dihydrate. Two weight percent of basic ferric acetate (0.010 M) was used with an equal equimolecular amount of the zinc acetate dihydrate. After about two and a half weeks, 94 weight percent (based on propylene oxide) of purified polymer was obtained. The polymer had physical characteristics similar to those obtained with a catalyst consisting of aluminum isopropylate and zinc acetate dihydrate (Example I). It was a stiff, somewhat tacky paste. The hydroxyl content (weight percent) was 1.0; unsaturation 0.011 meq./g.; saponification number 19.0; intrinsic viscosity 0.39 dl./g.; yield based on propylene oxide, 94 weight percent.

Example V

The following reactants were charged into a 3-necked flask connected to a Dry Ice-acetone cooled trap.

| Reactant: | Weight (gm.) |
|---|---|
| Aluminum isopropylate, 0.1 mole | 20.4 |
| Polypropylene glycol, 0.3 mole | 127.5 |

Upon heating, evolution of isopropyl alcohol occurred at 120° C. and the temperature was gradually raised to 160° C. in order that the theoretical amount of alcohol (18 grams) be evolved. The product, the aluminum alkoxide of polypropylene glycol, was a very thick liquid at room temperature and a molecular weight of 1400.

A glass ampule was then charged with 100 g. (1.72 M) of propylene glycol, 9.1 g. (0.007 M) of aluminum alkoxide of polypropylene glycol and 1.54 g. (0.007 M) of zinc acetate dihydrate.

The ampule was flushed with nitrogen, sealed and placed in a water bath at 56–59° C. After approximately 20 hours half of the content was polymerized. By the fourth day most of the propylene oxide was polymerized. Purification was effected after nine days by washing the product in benzene solution with a 2 weight percent sulfuric acid solution and with water until neutral. The yield was 104 grams. The hydroxyl content of the resulting polypropylene oxide was 1.2 weight percent; saponification number 6.9; unsaturation 0.009 meq./g.; viscosity, as measured by 4 grams in 100 cc. of solution in benzene at 25° C., 4.2, molecular weight 2380. The yield based on propylene oxide was 104 percent, indicating that at least part of the fraction of the polypropylene glycol 425 was present in the polymer.

*Example VI*

The procedure of Example V was repeated, however, the polymerization catalyst consisted of aluminum isopropylate and zinc glycollate (i.e. the zinc salt of hydroxy acetic acid) dihydrate. An equimolecular mixture of these two components functioned as a comparatively effective catalyst. 3.2 weight percent catalyst was used, and the polymerization was effected in an unshaken ampule at 56–59° C. After twenty-eight days a yield of 88 percent based on propylene oxide was obtained. The product was a white, opaque, semi-rubbery mass. The hydroxyl content was 1.1 weight percent; saponification number 5.9; unsaturation less than 0.01 meq./g.; viscosity, as measured by 4 grams in 100 cc. of solution in benzene at 25° C., 6.47 cp. The molecular weight was about 3000.

*Example VII*

The following reactants were charged into a glass ampule which was flushed with nitrogen and sealed.

| Reactant: | Weight (gm.) |
|---|---|
| Butylene oxide | 20 |
| Propylene oxide | 80 |
| Aluminum isopropylate | 1.60 |
| Zinc acetate dihydrate | 1.67 |

The ampule was placed in a water bath at about 56–59° C. and was occasionally shaken. After 24 hours approximately one-fifth of the ampule's content was a solid opaque mass on the bottom where the unsolubilized fraction of the catalyst was settled. The remainder was a liquid which showed increasing viscosity with time. After a ten day period the product would not flow upon tilting the ampule. At this time the polymer was purified by washing with an acid solution and water, successively. This resulted in a yield of 81 grams of product. The unreacted fraction of monomers weighed 9.5 grams. Its composition was 2 percent water, 59.3 percent butylene oxide, and 38.7 percent propylene oxide. The resultant copolymer had a hydroxyl content of 1.1 percent, an unsaturation of less than 0.01 meq./g., a saponification number of 7.8, and a viscosity, as measured by 4 grams in 100 cc. of solution in benzene at 25° C., of 4.2. The copolymer was a stiff paste having physical characteristics similar to those described in the preceding examples.

*Example VIII*

Aluminum hydroxide was prepared by hydrolysis of aluminum isopropylate. To a solution of 3 grams of aluminum isopropylate in 50 cc. of benzene, 2.6 g. of water in 50 cc. of isopropyl alcohol was added. (This is 3.5 times the amount of water necessary for hydrolysis of the aluminum isopropylate.) The mixture was initially clear, but after a few seconds, it became hazy and the separation of solid was noticed. The whole was refluxed for 30 minutes and left overnight at room temperature. The mixture was filtered and the gelatinous solid was washed in the filter, first with 1:1 v./v. mixture of isopropyl alcohol-benzene and then twice with benzene. The washed precipitate was transferred to a glass ampule, where 1.7 g. of zinc acetate dihydrate was added together with 100 g. of propylene oxide. The ampule was stirred in a bath at 60° C. The polymer obtained after eight weeks was dissolved in 600 cc. of benzene and washed twice with a 2% sulfuric acid solution and then with water. By stripping in a vacuum oven at 10° C. and 15 mm. Hg, 98.5 g. of polymer were obtained. The hydroxyl content was 1.0 weight percent; unsaturation 0.009 meq./g.; saponification number 8.9; molecular weight 2700; yield 98% (based on propylene oxide).

*Example IX*

The following charge was sealed in a glass ampule.

| Reactant: | Weight (gm.) |
|---|---|
| Propylene oxide (.05% weight water) | 100 |
| Aluminum oleate | 6.9 |
| Zinc acetate dihydrate | 1.76 |

The ampule was kept tumbling in a 60° C. bath provided with means for maintaining tumbling of the ampule. After 12 days, unreacted propylene oxide was removed under a vacuum leaving 102 g. of crude polymer. The polymer was dissolved in 400 cc. of benzene and the solution was washed twice with dilute sulfuric acid and then washed with water until neutral. Volatiles were removed by evaporation at 100° C. under 15 mm. Hg absolute pressure. The polymer product was a rigid paste having a hydroxyl content of 0.81% by weight; an acid number of 0.16; unsaturation 0.09 meq./g.; a saponification number of 12.4 and an average molecular weight of 2500.

*Example X*

Example IX was repeated using the same ingredients and proportions except that 1.5 g. of n-propyl borate was used in place of the aluminum oleate and reaction was continued for 8 days instead of 12 days. The polymer product was a soft paste having a hydroxyl content of 0.92%; unsaturation 0.009 meq./g.; saponification number of 9.7; calculated average molecular weight of 2800.

*Example XI*

Example IX was repeated using the same ingredients and proportions except that 0.5 g. of boric acid having 29.4% water content was used in place of the aluminum oleate and the reaction was continued for 5 days instead of 12 days. The polymer product was a soft paste having a hydroxyl content of 1.2% by weight, unsaturation of 0.016 meq./g., saponification number of 8.6, acid number of 0.2 and molecular weight of 2400.

The products of Examples II to XI were subsequently saponified in accordance with the procedure set forth in Example I to provide polyethers having comparatively high hydroxyl contents.

It will be understood that variations can, of course, be made without departing from the spirit of my invention.

Having thus described my invention, what I desire to secure by Letters Patent is:

The method of forming polymers having terminal carboxylate groups from olefinic oxides containing less than 5 carbon atoms which comprises (1) adding to said olefinic oxide up to about 1 weight percent of water and about 0.2 to 10 weight percent of a catalyst consisting essentially of a combination of a zinc salt of a carboxylic acid selected from the group consisting of formic acid, acetic acid and glycolic acid and a second compound which is aluminum isopropylate, and (2) heating this mixture of said olefinic oxide, water and said catalyst to about 60–140° C.

References Cited by the Examiner

UNITED STATES PATENTS

| | | | |
|---|---|---|---|
| 1,784,583 | 12/1930 | Dreyfus | 252—431 |
| 2,339,066 | 1/1944 | Fischer et al. | 252—431 |
| 2,436,774 | 1/1948 | Nutting et al. | 252—431 X |
| 2,457,139 | 12/1948 | Fife et al. | 260—615 |
| 2,565,487 | 8/1951 | Filachione et al. | 260—484 |
| 2,934,505 | 4/1960 | Gurgiolo | 260—2 |
| 2,940,982 | 6/1960 | Sullivan | 260—2 |
| 2,950,310 | 8/1960 | Kirkpatrick | 260—484 X |
| 2,950,313 | 8/1960 | Kirkpatrick | 260—484 |

OTHER REFERENCES

Mellor: "Modern Inorganic Chemistry," Longmans, Green, 1917, London, p. 450 relied on.

WILLIAM H. SHORT, *Primary Examiner.*

JOSEPH L. SCHOFER, P. E. MANGAN, L. P. QUAST, R. A. BURROUGHS, S. N. RICE, J. E. ALIX,
*Assistant Examiners*